A. BROWN.
HEATING STOVE.
No. 64,943. Patented May 21, 1867.
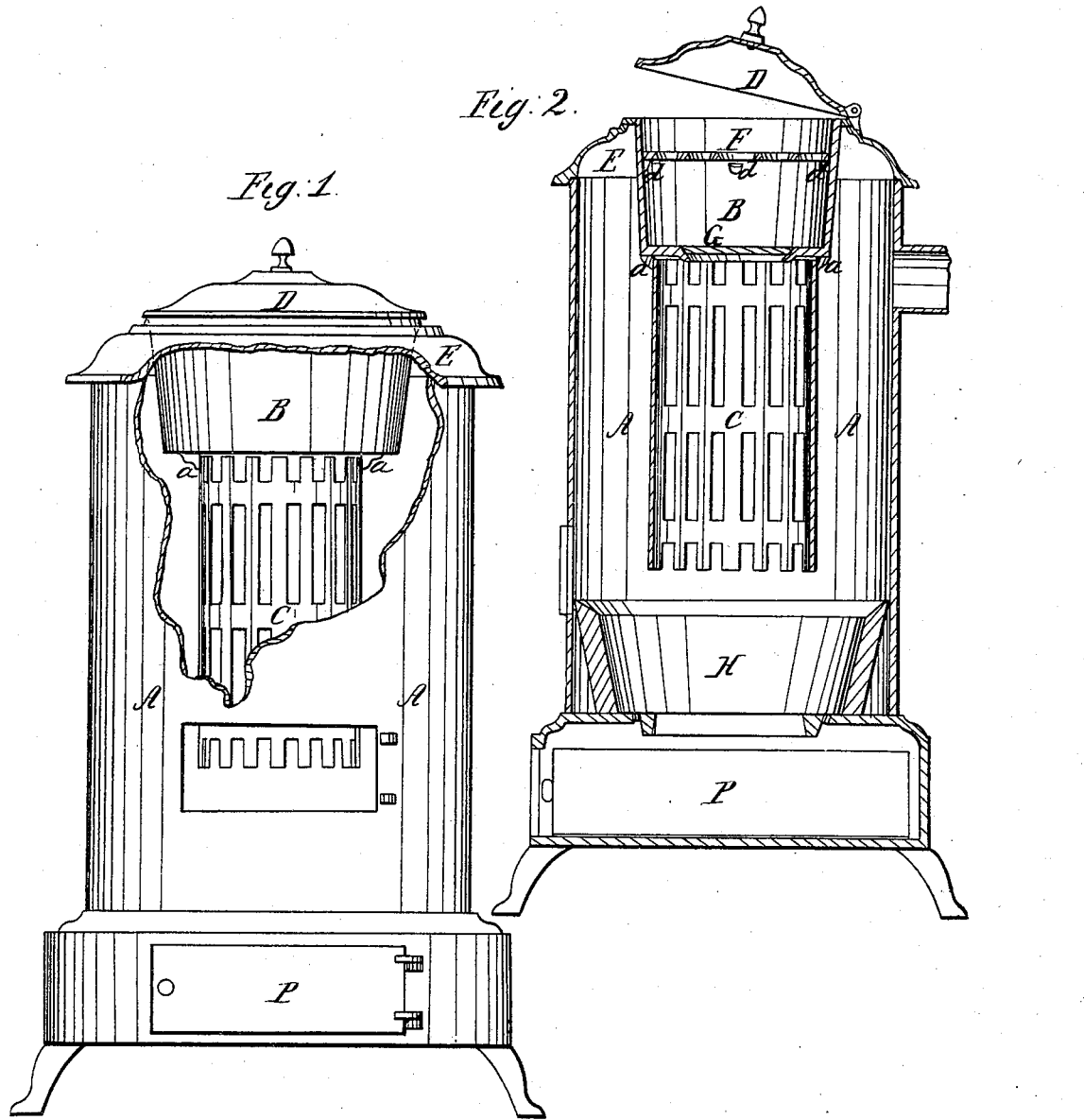

United States Patent Office.

ALBERT BROWN, OF TROY, NEW YORK.

Letters Patent No. 64,943, dated May 21, 1867.

IMPROVEMENT IN HEATING-STOVES.

*The Schedule referred to in these Letters Patent and making part of the same.*

TO ALL WHOM IT MAY CONCERN:

Be it known that I, ALBERT BROWN, of Troy, in the county of Rensselaer, and State of New York, have invented a new and useful Improvement in Stoves; and I do hereby declare that the following is a full and exact description of the same, reference being had to the annexed drawings, and to the letters of reference marked thereon, and forming a part of this specification, in which—

Figure 1 is a front elevation of a stove with my improvement; and

Figure 2 is a vertical section of the same.

The same letters refer to like parts in each of said figures.

The nature of my said invention and improvement consists in the relative arrangement, in a base-burning stove, of a fuel-reservoir or supply-chamber, and an oven, in such manner that said fuel-reservoir or supply-chamber is located or arranged vertically below and adjoining the bottom plate of said oven, or adjacently thereto, in manner substantially and for the purpose as hereinafter fully described.

To enable others skilled in the art to make and use my said invention and improvement, I now proceed to fully describe its construction.

A A, figs. 1 and 2, represent the external or outside walls of a heating-stove, which is provided with a fire-pot, H, and ash-pit, P, of the usual manner of construction. In the top plate E of such a stove is made an opening or aperture, within which, and supported in its position by a flange at its upper part, which rests upon the top edge of said opening, is placed an oven, B. This oven projects its whole depth, or thereabouts, down into the combustion or flame-chamber of the stove. It may be covered by a hinged lid, D, or by a removable cover. The oven is likewise provided with a perforated or slotted rack, F, resting upon lugs $d\,d$. This rack is for the purpose of supporting articles upon it to be baked or cooked. In the bottom plate of this oven is made a feed-aperture, G, through which fuel is introduced into a fuel-reservoir; this feed-aperture serves also for a boiler-hole, within which may be placed a vessel for the purpose of heating or boiling its contents. When not in use, said feed-aperture and boiler-hole is covered with a lid. Attached directly to and under the bottom of aforesaid oven is a base-burning fuel-reservoir or supply-chamber, C, it being secured thereto by means of lugs and bolts $a$, or in any other suitable manner; or it may be supported therein by the lugs or arms projecting from said fuel-reservoir, being attached to said oven or to the side walls of the stove. Various other modifications of construction and arrangement may be made, provided the essential features of my invention, as herein set forth, are retained.

My improvement thus described and shown substantially in the annexed drawings combines in one stove the conveniences of a fuel-reservoir and of an oven, thereby rendering it convenient to cook by, and, with a fuel-reservoir heating-stove, making of it an improved and more useful article of household comfort than heretofore, and without impairing its efficiency as a heating-stove. The fuel-reservoir under the oven-bottom plate may be easily and conveniently replenished with fuel through the feed-aperture or boiler-hole aforesaid, in the oven-bottom plate; and any coal spilling over on the bottom of the oven is easily brushed into the fuel-reservoir.

What I claim as my invention, and desire to secure by Letters Patent, is—

In connection with the combustion-chamber of base-burning stoves, I claim the arrangement of a fuel-reservoir or supply-chamber, C, directly under an oven, B, substantially in manner as herein described, and for the purpose set forth.

ALBERT BROWN.

Witnesses:
I. L. BARNEY,
J. J. SAVAGE.